Nov. 21, 1933.    F. W. HALL    1,935,709
FRACTIONATING APPARATUS
Filed Aug. 26, 1931
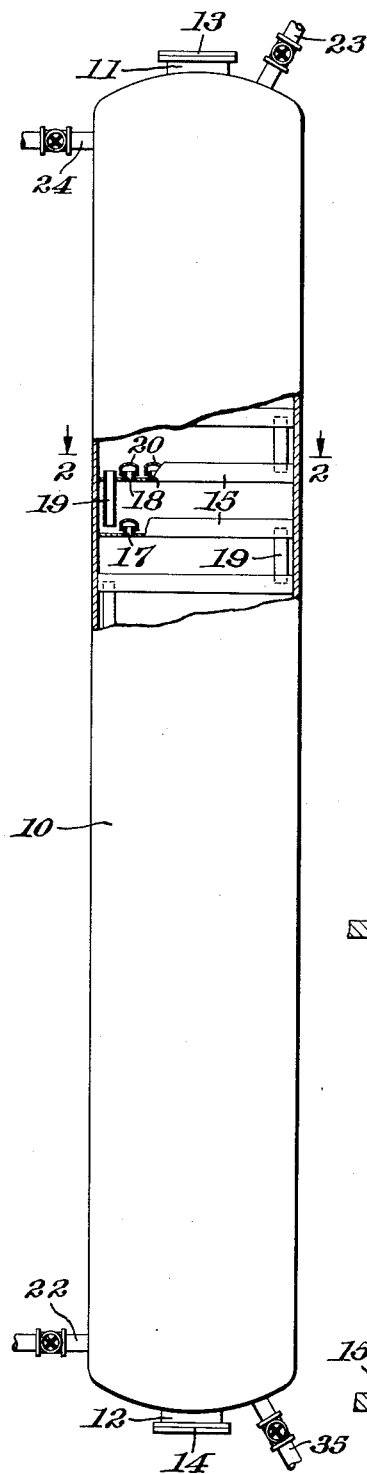
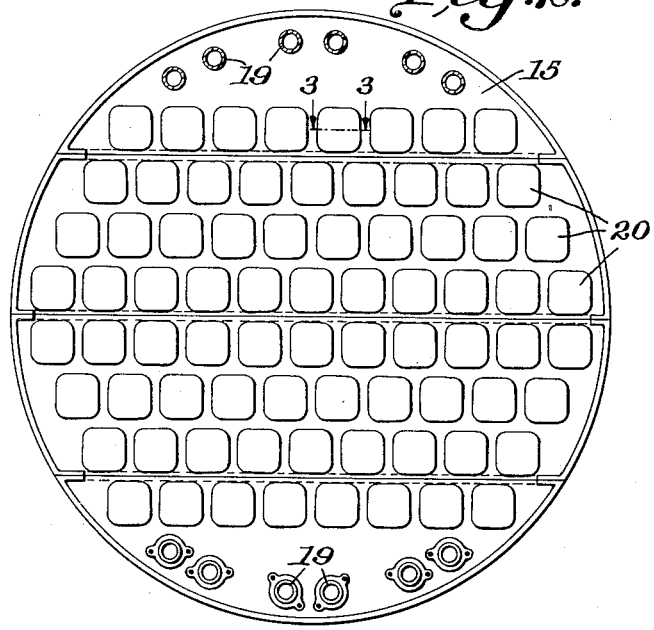
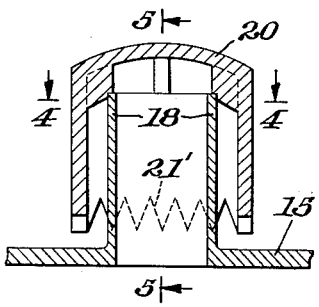
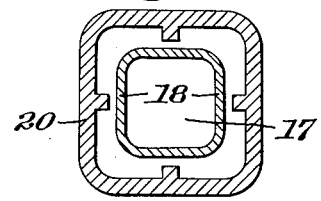
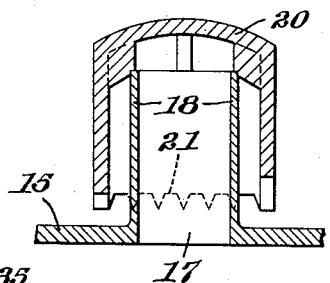
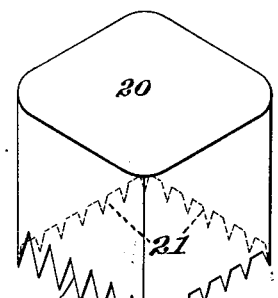
FRANK W. HALL
INVENTOR
BY R. J. Dearborn
HIS ATTORNEY Patented Nov. 21, 1933

1,935,709

UNITED STATES PATENT OFFICE 1,935,709

FRACTIONATING APPARATUS

Frank W. Hall, Port Arthur, Tex., assignor to The Texas Company, New York, N. Y., a corporation of Delaware Application August 26, 1931. Serial No. 559,385

8 Claims. (Cl. 261—114)

This invention relates to the treatment of hydrocarbon oils and has particular reference to dephlegmators or fractionating apparatus for effecting condensation, dephlegmation or fractionation of hydrocarbons.

One of the objects of the invention is to provide a fractionating tower that will facilitate the effective contact between the vapors and liquids being treated and at the same time will effectually prevent priming in the tower.

Referring to the drawing:

Fig. 1 is a diagrammatic view in elevation of a fractionator constructed in accordance with the invention.

Fig. 2 is a plan on the line 2—2 of Fig. 1 showing a view of the assembled sections of a bubble tray.

Fig. 3 is an elevation along the line 3—3 of Fig. 2 showing in detail a bubble cap assembly.

Fig. 4 is a plan on line 4—4 of Fig. 3.

Fig. 5 is an elevation along the line 5—5 of Fig. 3.

Fig. 6 is a perspective view of one of the bubble cap assemblies.

The dephlegmator illustrated is in the form of a bubble tower and as shown in Figs. 1 and 2 comprises a tank or casing 10 having a manhole 11 at the top and manhole 12 at the bottom, closed respectively by covers or plates 13 and 14, and a plurality of horizontal partitions 15 forming trays or shallow containers.

Each tray or partition 15 is perforated by holes 17 which are staggered with respect to each other, each hole being surrounded by a short pipe or nipple 18 to enable vapors to pass upwardly therethru without permitting leakage of liquid from the trays, except thru the overflow outlet pipes 19 which extend from the liquid level of a given tray down into the liquid on the tray beneath. The ends of the nipples are covered by caps 20, each of which has notches or recesses 21 and 21' at its edges and is deep enough to clear the top of the nipple as shown in Fig. 1, the recesses 21' being of greater height as shown. The vapors rising from the chamber below are thus permitted to flow thru the nipples but are forced to bubble thru the liquid in the tray before they escape into the chamber above.

A pipe 22 conducts the vapors to be fractionated from a still (not shown) to the fractionating tower 10 and a vapor line 23 is provided for removing vapors from the upper end of the tower. The vapor line 23 may extend directly to a final condenser such as a condenser coil (not shown) for condensing the vapors removed from the dephlegmator or if desired a reflux condenser may be interposed in the line 23 for effecting a condensation of a portion of the vapors passing to the final condenser, and thus form a condensate that may be employed as a reflux or cooling medium for the tower 10. A pipe 24 is shown thru which the reflux condensate obtained from such a reflux condenser may be introduced to the dephlegmator 10, or if desired, fresh charging stock or fresh charging stock combined with reflux condensate, may be introduced through the line 24. A pipe 35 is provided for withdrawing condensate from the tower.

In practicing the invention with the apparatus illustrated the vapors to be fractionated enter from the still thru the vapor line 22 by which they are directed into the lower part of the tower 10. As the vapors rise in the dephlegmator they are forced to bubble thru the liquid carried on the trays or partitions of the dephlegmator, thus vaporizing the lighter constituents of the liquid and condensing the heavier constituents of the vapors. Finally the comparatively light vapors which reach the top of the dephlegmator pass out thru pipe 23. As the liquid increases on the trays of the dephlegmator it overflows thru pipes 19 each of which extends down into the liquid on the tray beneath, whereby a seal is effected to prevent the flow of vapors upwardly thru said pipes. Preferably the downflow pipes 19 are of such area and length that the head of liquid maintained therein will insure a regulated flow of liquid from tray to tray and thus prevent priming or building up of liquid in the tower. It will be noted that the openings at 19 are round, thus providing high cross sectional area on the basis of minimum perimeter. This is calculated to secure maximum flow for a given pressure head. If desired, caps (not shown), may be placed over the pipes 19 to prevent the entrainment of vapor with the liquid. Each tray has been shown as provided with a plurality of the downflow pipes 19, these pipes being arranged fairly close together as illustrated more clearly in Fig. 2. It is contemplated that the downflow capacity provided by the pipes 19 will be sufficient to accommodate the condensate as formed when running the apparatus at capacity.

As shown in Fig. 4, the vapor nipples 18 and the caps 20 are substantially square. This arrangement is of advantage as it provides large surface of contact between the vapors and liquid for a given cross sectional area. Preferably the area of the nipples 18 is substantially equal to that of the annular space between the nipples 18 and the caps 20 whereby maximum flow of vapors may be obtained.

By reference to Figs. 1 and 2 it will be seen that all of the overflow pipes 19 of any one tray are located on one side of the tray whereby a positive flow of liquid across the tray in one direction may be effected. This serves to decrease channeling and stagnation to a minimum.

As indicated in Figs. 3 through 6, the notches 21 at the lower edges of the caps 20 are not of the same depth, the recesses 21' on one side (Fig. 3) being deeper than on the other three sides 21. It is contemplated that all of the caps 20 as installed will face in the same direction, with the side affording the slightest amount of liquid immersion nearest the overflow pipes 19. Thus when the apparatus is operating at capacity or less there will be a tendency for all of the caps to function uniformly and the escaping vapors moving in a single direction will have the effect of pushing the liquid toward the downflow side of the tray. Stagnant areas may be thus eliminated and positive control of the time of contact between the vapors and the reflux liquid effectually secured.

The apparatus herein disclosed is adapted for use under high pressure and may be thus employed for fractionating fluids under pressure, such as the fractionation of vapors evolved from a pressure cracking still. The invention may also be applied to the ordinary distillation of hydrocarbons.

Obviously many modifications and variations of the invention, as hereinbefore set forth, may be made without departing from the spirit and scope thereof, and therefore only such limitations should be imposed as are indicated in the appended claims.

I claim:

1. In a fractionating tower, a chamber, a plurality of bubble trays therein, a bubble cap assembly for said trays comprising a vapor nipple and a cap adapted to be partially immersed in a body of liquid on a tray, said cap being formed with peripheral openings extending substantially entirely around the same and with the openings on different sides thereof extending upwardly to points of different levels with respect to the surface of the liquid on said trays.

2. In a fractionating tower, a chamber, a bubble tray in said chamber adapted to retain a body of liquid, means for overflowing excess liquid from said tray, a plurality of bubble cap assemblies each comprising a vapor nipple and a cap, said caps being formed with a succession of openings extending around a plurality of sides of the same, the openings on the different sides of said caps extending to different heights, the caps being positioned to direct the openings extending to a greater height on each cap in the same direction.

3. In a fractionating tower, a chamber, a bubble tray therein adapted to retain a body of liquid, means for overflowing excess liquid from the tray, vapor nipples and caps on said tray, said caps having peripheral openings on a plurality of sides thereof for causing vapors to bubble thru the liquid on the tray, said caps having larger openings on the side nearest the overflow means whereby a greater volume of vapors may be released on that side to give a positive direction of movement to said liquid.

4. In a fractionating tower, a chamber, a bubble tray adapted to retain a body of liquid, overflow pipes at one side of the tray for withdrawing excess liquid therefrom, vapor nipples and caps on said tray, said caps having transverse openings on a plurality of sides thereof for causing vapors to bubble thru the liquid on the tray, said caps having larger openings on the side nearest the overflow pipes whereby a greater volume of vapor will be released on that side to positively move the liquid in the direction of the overflow pipes.

5. In a fractionating tower, a chamber, a bubble tray in said chamber adapted to retain a body of liquid, means for overflowing excess liquid from said tray, said overflow means being located at one side of said tray, a plurality of vapor nipples and bubble caps for said nipples, each of said caps being provided with notches around its periphery with the notches on one side longer than the notches on the other side, said bubble caps being arranged with the sides having the longer notches facing toward said overflow means so that vapors in bubbling through said longer notches will tend to cause a flow of said liquid toward said overflow means.

6. In a fractionating tower, a chamber, a series of liquid retaining trays extending across said chamber and each formed with overflow means for conducting liquid to the next succeeding lower tray and with a plurality of vapor nipples provided with bubble caps for conducting vapors from beneath each tray to a position above said tray, said overflow means on each succeeding tray being positioned at a remote side of the chamber from the overflow means on the next adjacent tray, the caps on each said tray being formed with passages on a plurality of sides for contacting upwardly rising vapors with liquid on the tray, said passages on the different caps of each tray being constructed for directing a larger proportion of vapors and for indirectly directing liquid on said tray toward the overflow means on said tray.

7. In a fractionating tower, a chamber, a bubble tray in said chamber adapted to retain a body of liquid, means for overflowing excess liquid from said tray, a plurality of vapor nipples on said tray and bubble caps for said nipples, each of said caps being provided with recesses around its periphery with the recesses on one side longer than those on the other side, said bubble caps being arranged with the sides having the longer recesses facing toward said overflow means so that vapors in bubbling through said longer recesses will tend to cause a flow of said liquid toward said overflow means.

8. In a bubble tray for a fractionating tower, a plurality of vapor nipples and bubble caps arranged over said nipples each of said caps being substantially square in shape and adapted to be partially immersed in a body of liquid on said tray whereby vapors may be caused to bubble through said liquid, and each of said bubble caps being provided with openings around its periphery, the openings on one side extending to a greater height than the openings on the other sides.

FRANK W. HALL.